US 6,725,526 B2

(12) United States Patent
Lille

(10) Patent No.: US 6,725,526 B2
(45) Date of Patent: Apr. 27, 2004

(54) METHOD OF FORMING MICROSUSPENSION ASSEMBLIES FOR DIRECT ACCESS STORAGE DEVICES

(75) Inventor: Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 83 days.

(21) Appl. No.: 10/047,229

(22) Filed: Jan. 14, 2002

(65) Prior Publication Data

US 2003/0133229 A1 Jul. 17, 2003

(51) Int. Cl.⁷ .......................... G11B 5/127; H04R 31/00
(52) U.S. Cl. .................... 29/603.1; 29/428; 29/603.07; 29/603.12; 29/603.16; 29/851; 216/22; 216/39; 216/41; 264/434; 360/234.5; 360/235.8; 438/3
(58) Field of Search ................. 29/428, 603.1, 29/603.07, 603.12, 603.16, 851; 360/234.5, 235.8; 264/434; 216/39, 41, 48, 22; 438/3

(56) References Cited

U.S. PATENT DOCUMENTS

| | | | | |
|---|---|---|---|---|
| 4,582,632 A | * | 4/1986 | Rokujo et al. ........... 252/502 |
| 5,400,192 A | * | 3/1995 | Mizoshita et al. ....... 360/77.16 |
| 5,711,063 A | | 1/1998 | Buddle et al. ........... 29/603.06 |
| 5,783,326 A | * | 7/1998 | Hasebe .................... 429/57 |
| 5,793,571 A | | 8/1998 | Jurgenson et al. ........ 360/104 |
| 5,825,590 A | | 10/1998 | Ohwe ....................... 360/104 |
| 5,894,655 A | | 4/1999 | Symons ................. 29/603.03 |
| 6,005,750 A | | 12/1999 | Willard et al. ............ 360/104 |
| 6,245,313 B1 | * | 6/2001 | Suzuki et al. ........... 423/445 R |
| 6,359,752 B1 | * | 3/2002 | Imamura ................ 360/234.7 |

FOREIGN PATENT DOCUMENTS

| | | | | |
|---|---|---|---|---|
| JP | 06151327 A | * | 5/1994 | ......... H01L/21/205 |
| JP | 08133837 A | * | 5/1996 | ........... C04B/35/52 |
| JP | 10194836 A | * | 7/1998 | ........... C04B/35/52 |

OTHER PUBLICATIONS

"Vibration of head suspensions for proximity recording"; Takahashi, H.; Bogy, D.B.; Matsumoto, M.; Magnetics, IEEE Transactions on, vol.:34 Issue: Jul. 4, 1998; pp. 1756–1758.*

Schueller et al., "Fabrication of glassy carbon microstructures by soft lithography," *Sensors and Actuators*, A72 (1999) 125–139.

Wu et al., "Silicon micromachined integrated suspension systems for magnetic disk drives," *Sensors and Actuators*, A55 (1996) 195–200.

* cited by examiner

*Primary Examiner*—A. Dexter Tugbang
*Assistant Examiner*—Paul Kim
(74) *Attorney, Agent, or Firm*—Konrad, Raynes & Victor, LLP; Alan S. Raynes

(57) ABSTRACT

Embodiments include a method for forming a head suspension assembly. A spacer layer is formed in or on a silicon wafer. A transfer film including an opening defining the shape of a slider support membrane is provided, and the opening is filled with a resin material. The transfer film with the resin material therein is positioned over the silicon wafer so that at least a portion of the resin material is positioned adjacent to the spacer layer. The resin material is baked to form a glassy carbon material. The spacer layer is etched to form a trench in the silicon wafer adjacent to the glassy carbon material, and a slider is positioned on the glassy carbon material over the trench.

20 Claims, 10 Drawing Sheets

METHOD OF FORMING MICROSUSPENSION ASSEMBLIES FOR DIRECT ACCESS STORAGE DEVICES

FIELD OF THE INVENTION

Embodiments of the present invention relate generally to disk drive systems and to microsuspension structures which support read/write recording heads within the systems.

DESCRIPTION OF RELATED ART

Direct access storage devices typically include a rotatable magnetic disk having concentric data tracks defined for storing data, and a magnetic recording head or transducer for reading data from and writing data to the various data tracks. In typical disk drive systems, a stack of one or more magnetic disks is mounted over a spindle on a drive motor. The system also includes a head actuator including a head suspension assembly for supporting and moving the magnetic recording head relative to the disk surfaces, and electronic circuitry for processing signals to implement various functions of the disk drive. The head suspension assembly typically provides an arm-like structure. The suspension assembly supports the head close to the surface of the disk as the disk rotates. The magnetic head is carried on a slider having an air bearing surface which is positioned during operation adjacent to the data surface of the disk and usually separated from the surface of the disk by a cushion of air generated by the rotating disk. The terms "head" and "slider" are sometimes both used to refer to the slider having a head attached thereon. The slider design affects the efficiency, density, speed and accuracy with which the data can be read and written to the disk.

The suspension assembly connects the slider to a rotary or linear actuator which operates to move the suspension assembly to position the magnetic head directly adjacent to the desired track location on the disk. Suspension assemblies are typically shaped as an elongated load beam adapted to be connected to an actuator arm at one end. The other end includes a flexure member on which the slider is positioned. The flexure member is designed to permit an amount of spring-type movement of the slider, while also being rigid in a lateral direction to minimize undesirable side to side motion of the slider. Steel has been used as a suspension assembly material due to its mechanical properties and because it can be milled into fine structures. However, as magnetic heads and sliders become smaller and lighter, smaller suspension assemblies with a higher width to thickness ratio are needed. However, materials such as steel have a limited strength to mass ratio.

Silicon has been proposed as a magnetic head suspension assembly material. The use of silicon for the entire head suspension assembly has certain advantages such as the ability to form certain electrical components directly on the assembly, and the ability to utilize certain processing methods similar to those used for integrated circuit manufacture. U.S. Pat. No. 5,711,063 describes a process for forming a magnetic head assembly in which silicon is cut into a suspension assembly shape and then masked and etched to remove additional silicon and to form structures such as a plateau on the head suspension assembly. However, micromachining silicon to form such structures is time consuming and complex and such silicon structures may lack the necessary mechanical properties needed for the suspension assembly.

SUMMARY

Certain embodiments relate to suspension structures for a magnetic recording head and methods for producing such suspension structures. The suspension arm contains a membrane structure that primarily supports the head structure. Other properties include the option to electrically conduct or isolate conductive paths to and from the head via the suspension arm.

Embodiments include a head suspension assembly including a suspension arm having a trench formed therein. The head suspension assembly also includes a membrane positioned on the suspension arm and adapted to support a slider thereon, wherein at least a portion of the membrane is positioned adjacent to the trench. In one aspect of certain embodiments, the suspension arm is silicon and the membrane is a glassy carbon material.

Embodiments also include a method for forming a head suspension assembly. The method includes forming a spacer layer in a portion of a substrate. The method also includes forming a transfer film having a mold of a suspension membrane therein, and filling the mold of the suspension membrane with a layer of material. The transfer film including the mold of the suspension membrane filled with the layer of material is positioned over the substrate. The layer of material is baked to densify at least a portion of the layer of material. The spacer layer is removed from the substrate to form a cavity extending a distance into the substrate, and the baked layer of material is at least partially positioned over the cavity.

Embodiments also include a method for forming a head suspension assembly, including forming a spacer layer in or on a silicon substrate. A transfer film having an opening defining the shape of a slider support membrane is provided, and the opening is filled with a resin material. The transfer film with the resin material therein is positioned in contact with the silicon substrate so that at least a portion of the resin material is positioned adjacent to the spacer layer. The resin material is baked to form a glassy carbon material, and the spacer layer is removed to form a cavity in the silicon substrate surface adjacent to the glassy carbon material.

Embodiments also include a method for forming a head suspension assembly, including forming a sacrificial layer in or on a portion of a substrate. A transfer film is formed across the substrate. A patterned photoresist layer is formed on top of the transfer film. The method also includes transferring the image of patterned photoresist layer through the transfer film, and removing the patterned photoresist layer. In addition, the sacrificial layer is removed to form a cavity extending a distance into the substrate.

Embodiments also include a disk drive for reading and writing disks. The disk drive includes at least one disk and read/write head adapted to read from and write to the disk. The disk drive also includes a slider onto which the read/write head is provided. The disk drive also includes a suspension assembly adapted to support the slider, wherein the suspension assembly includes a membrane positioned on a support arm having a cavity therein, and the membrane is positioned to extend adjacent the cavity. The disk drive also includes a rotatable hub for mounting the disk.

BRIEF DESCRIPTION OF THE DRAWINGS

Certain embodiments of the invention are described with reference to the accompanying drawings which, for illustrative purposes, are schematic and not necessarily drawn to scale.

DETAILED DESCRIPTION

Preferred embodiments of the present invention are described with reference to FIGS. 1–13. While this invention is described in terms of the best mode for achieving this invention's objectives, it will be appreciated by those skilled in the art that variations may be accomplished in view of these teachings without deviating from the spirit or scope of the invention.

Certain embodiments relate to a structure that includes a thin membrane that acts as an intermediate structure between a suspension arm and an air-bearing slider body. The structure may preferably be formed from a glassy carbon material. In certain embodiments, the structure may be mass produced. The structure may include one or more of the following features: (1) it is independent of the suspension arm material, (2) it allows for a predetermined amount of pitch and roll compliance while maintaining its structural integrity, (3) it may be designed to include microsprings or integrated circuits therein, (4) it can be produced in an efficient and inexpensive manner, and (5) it can be handled without exposing the air bearing slider bond to stress damage.

Certain embodiments relate to a structure formed on a substrate using micro-contact printing with a carbon-rich resin filled over a sacrificial layer on a silicon suspension arm. Through a heat treatment process at elevated temperature, the resin is transformed into a glass-carbon alloy material that is less stiff and has a lower mass relative to the underlying silicon suspension arm. A process for forming a glass-carbon alloy material is described in an article entitled "Fabrication of glassy carbon microstructures by soft lithography," in *Sensors and Actuators*, A72 (1999) at pages 125–139, by authors Schueller, Brittain, and Whitesides, which is hereby incorporated by reference in its entirety.

Figure 1:
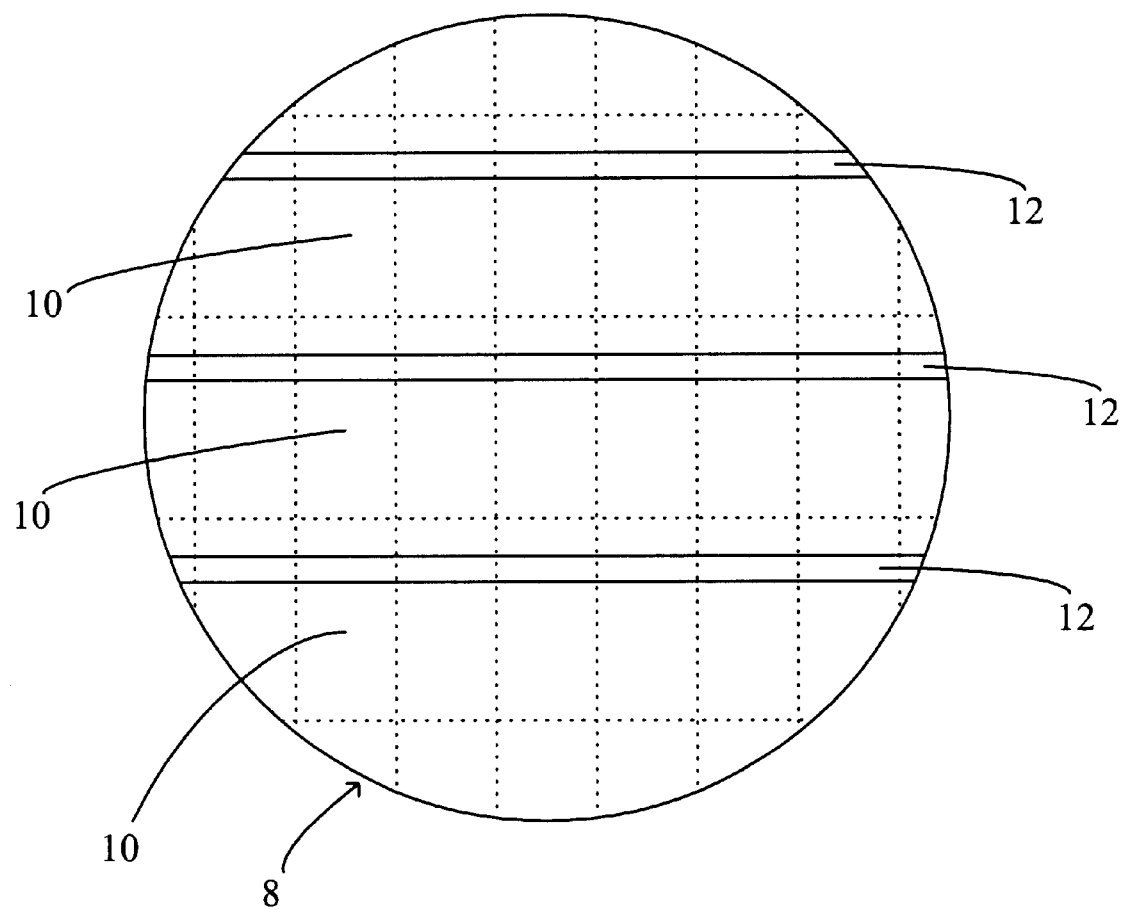
FIG. 1 illustrates a top view of a wafer from which a plurality of suspension assemblies may be formed and illustrates a sacrificial layer formed on the wafer during a manufacturing step in accordance with an embodiment of the present invention.
Figure 2A:
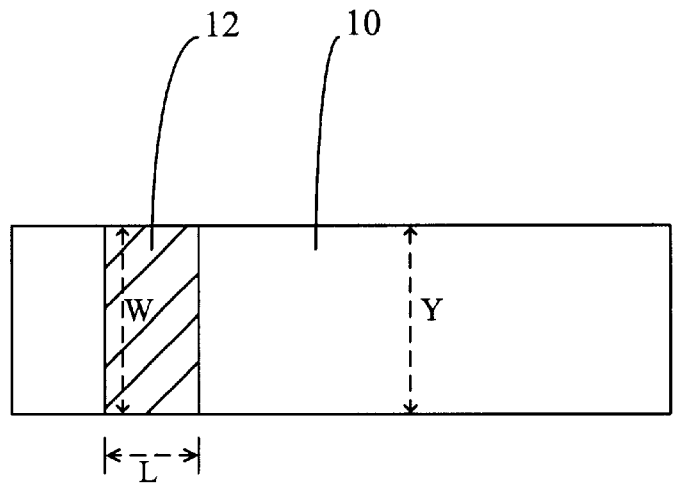
FIGS. 2a and 2b illustrate a top view and side view of a single suspension assembly illustrating the sacrificial layer shown in FIG. 1.
Figure 2B:
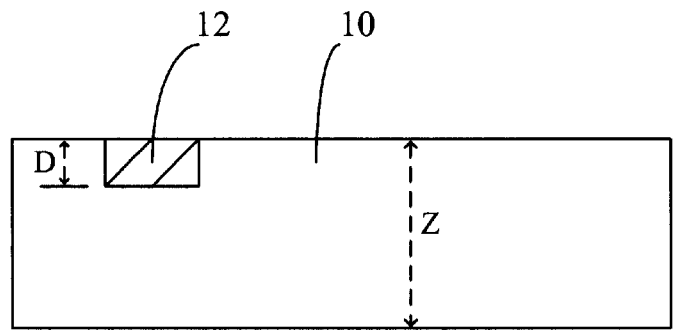

Preferred embodiments include a suspension assembly and its manufacturing process including the formation of a thin micromechanical membrane on an arm structure using a contact deposition process. As illustrated in FIG. 1, a suspension assembly structure may include a base formed from, for example, a silicon wafer 8 wherein a plurality of suspension arms 10 (as indicated by the dashed lines) are masked on the wafer 8. A sacrificial layer 12 is then formed on or embedded in the silicon wafer 8. The sacrificial layer 12 may be formed using a method such as, for example, etching and filling a trench or cavity in the silicon wafer 8 with a material such as, for example, copper, in a damascene process. This will leave the silicon wafer 8 with a surface having an in-laid copper trench (sacrificial layer 12). The depth and length of the trench may define a maximum deflection of the membrane and minimum length of the membrane. The silicon wafer surface and copper trench preferably have a planar surface. FIGS. 2(a) and 2(b) illustrate top and side views of a single suspension arm 10 having a sacrificial layer 12 in the trench. The maximum deflection of the membrane in this embodiment will be limited by the depth D of the trench holding the sacrificial layer 12, as seen in FIG. 2(b). As seen in FIG. 2(b), the suspension arm 10 may have a thickness Z, where D is less than or equal to Z. In addition, a membrane embodiment as described below may be formed to have a length greater than length L of the trench holding the sacrificial layer 12, as seen in FIG. 2(a). In addition, the suspension arm 10 may have a width Y and the sacrificial layer 12 may have a width W, as seen in FIG. 2(a). In preferred embodiments W is less than or equal to Y.

Figure 3:
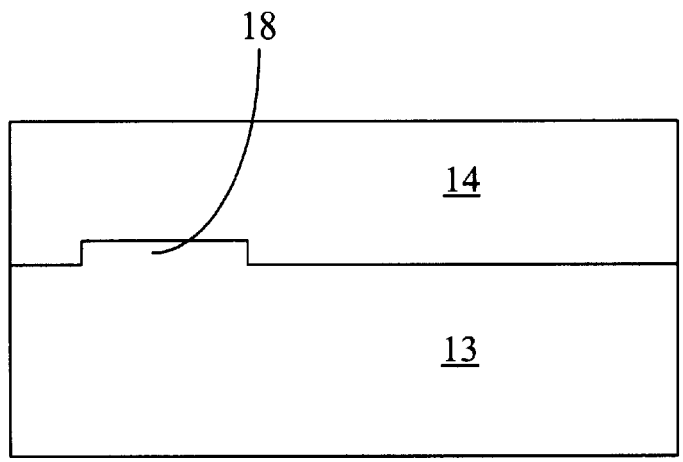
FIG. 3 illustrates a side view of a master structure including an inverse image of a membrane structure, and a molding or transfer film on the master structure during a manufacturing step in accordance with an embodiment of the present invention.

The formation of a polymer-resin contact layer is described next. A separate master structure such as a silicon wafer is provided with the etched inverse image of the membrane structure to be formed. The master may be formed by depositing, patterning and exposing a photoresist layer on the master wafer. The master wafer can be used to create polymer resin-transfer films. A layer of a material, for example, elastomeric polydimethylsiloxane, also known as PDMS (SYLGARD 184, Dow Corning) is formed on the master (for example, by a spin-on process) and conforms to the surface that includes the inverse image of the membrane structure. The PDMS is cured (for example, at 60° C. for 1 hour) to cross link the polymer and removed from the master wafer. The PDMS may shrink during the curing step. The removal may be carried out, for example, by peeling the PDMS from the master. A replica (transfer film 14) of the master silicon surface is thus formed. FIG. 3 shows a side view of a master 13 including an inverse image 18, and the transfer film 14 of the PDMS material. Other embodiments may use materials other than PDMS, such as other polymeric materials, for example.

Figure 4:
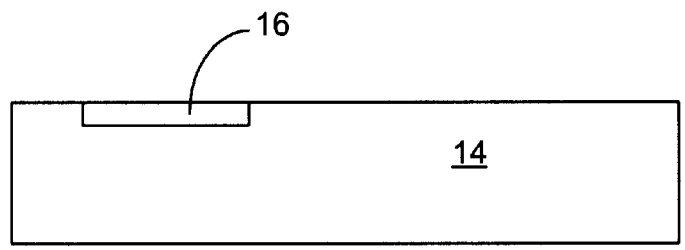
FIG. 4 illustrates the transfer film of FIG. 3 including a resin material in the opening in during a manufacturing step in accordance with an embodiment of the present invention.
Figure 5A:
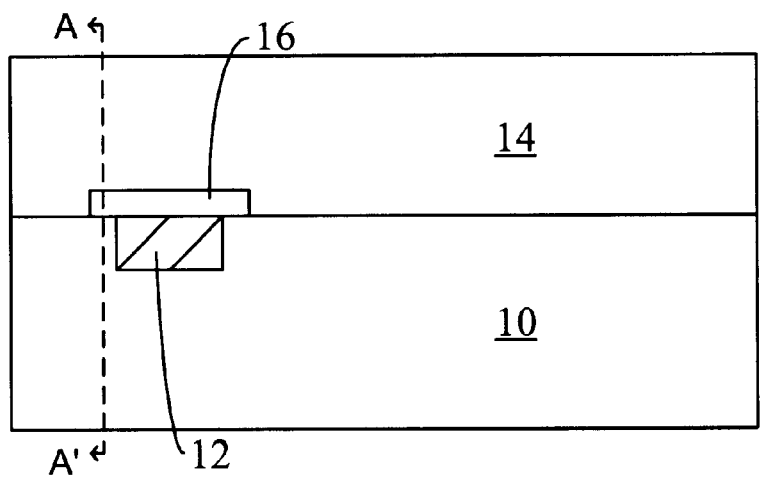
FIG. 5(a) illustrates the transfer film of FIG. 4 with the resin material therein positioned on the suspension assembly during a manufacturing step in accordance with an embodiment of the present invention.
Figure 5B:
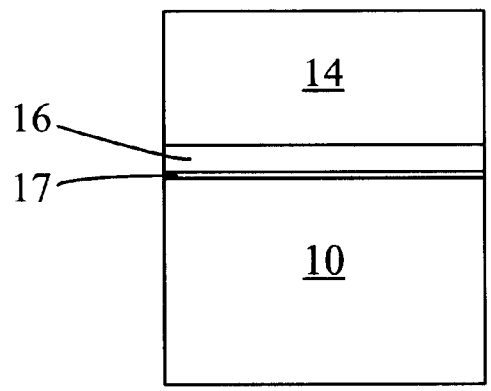
FIG. 5(b) illustrates a cross-sectional view of an embodiment along the line A-A' of FIG. 5(a).

As illustrated in FIG. 4, the transfer film 14 is removed from the master 13 and a resin-polymer film 16 is then coated on the transfer film 14 to fill the image of the membrane structure 18 in the transfer film 14. Methods which may be used for coating the resin-polymer including, but are not limited to dipping, pouring, spraying, and spin-on processes as known in the art. The resin-polymer film 16 is a precursor material that upon processing will form a glassy carbon material such as that described in the article "Fabrication of glassy carbon microstructures by soft lithography," in *Sensors and Actuators*, A72 (1999) at pages 125–139, by authors Schueller, Brittain, and Whitesides, which as noted earlier, is hereby incorporated by reference in its entirety. A variety of polymeric precursor materials including, for example, polyvinyl chloride, polyvinylidene chloride, polyacrylonitrile, cellulose, resins of phenol-formaldehyde, and polyfurfuryl alcohol may be used. One specific example includes a furfuryl alcohol-modified phenolic resin (FURCARB LP-520, from Q. O. Chemicals, West Lafayette, Ind.). A catalyst solution (for example, ZnCl in $H_2O$) may be included to assist in the curing of the resin-polymer material. Excess material is removed and the transfer film 14 with the resin-polymer 16 is positioned on the silicon suspension arm 10 having the copper sacrificial layer 12 as illustrated in FIG. 5(a). If desired, an adhesion layer may be formed on the silicon so that the resin-polymer and silicon form a strong bond. FIG. 5(b) illustrates an embodiment in cross section along the line A-A' of FIG. 5(a), including an optional layer 17 which may act as an adhesion layer between the silicon suspension arm 10 and the resin-polymer 16. Such an adhesion layer 17, if used, may be formed from a variety of materials, including, but not limited to Ta, Ti, TiN, and HMDS.

Figure 6:
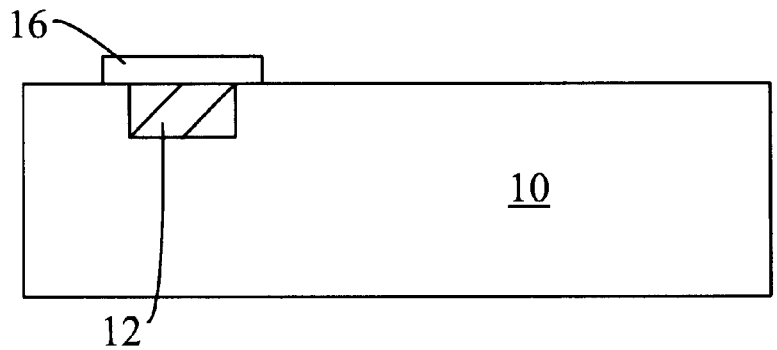
FIG. 6 illustrates the resin material positioned on the suspension assembly in accordance with an embodiment of the present invention.

The resin-polymer material 16 may then be carefully cured to cross-link the polymer, for example, by slowly raising the temperature from about 60° C. to 150° C. over about one hour. The slow increase in temperature is carried out to inhibit the formation of stresses leading to mechanical deformation of the structure. The PDMS transfer film 14 may then be removed, leaving the cured resin-polymer 16 on the suspension arm 10 over the copper sacrificial layer 12, as illustrated in FIG. 6. The PDMS transfer film 14 may be removed using a variety of methods, for example, peeling back the film, chemically removing the film, and burning off the film during a high temperature processing step. If desired, the resin-polymer may be degassed prior to transfer to the substrate and prior to heating, in order to remove any excess solvent and to limit shrinkage of the structure. In certain embodiments, after the transfer film with the resin-polymer is transferred to the substrate, it is held at room temperature for a time period (such as 12 hours, for example), which may help reduce residual stresses.

A high temperature baking process is applied (preferably in a noble gas) to cross link and carbonize the carbon-rich resin 16. When using a furfuryl alcohol-modified phenolic resin as the carbon-rich resin 16, the baking process may be carried out, for example, in argon at temperatures up to about 1100° C. One preferred embodiment utilizes a temperature of about 900° C. It is believed that the resin polymer is transformed into glassy carbon occurs by about 800° C. The baking causes a densification of the structure, in particular as the resin is being transformed into the glassy carbon. Preferably the shrinkage is limited to preserve the shape of the structure. The use of resins with a high carbon yield is preferred in order to minimize shrinkage. One or more cleaning steps may also be incorporated into the process (at various times) to remove left over molding materials, polymer materials, or other undesirable materials on the surface of the suspension arm 10. In preferred embodiments the glass carbon structure is relatively inert and electrically conductive. The microstructure generally includes randomly oriented crystallites in a glassy matrix. Glassy carbon is sometimes known in the art as vitreous carbon.

Figure 7A:
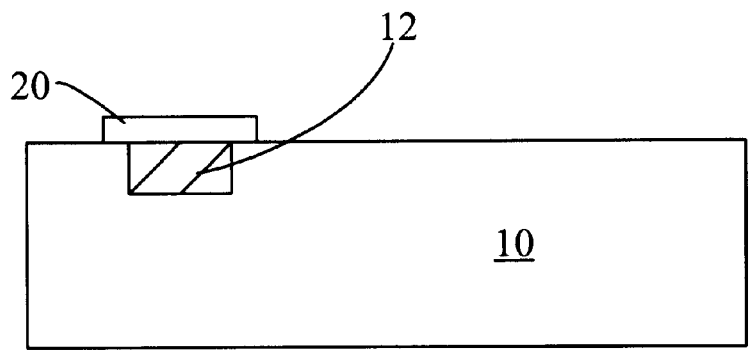
FIG. 7(a) illustrates a membrane formed on the suspension assembly after a baking step in accordance with an embodiment of the present invention.
Figure 7B:
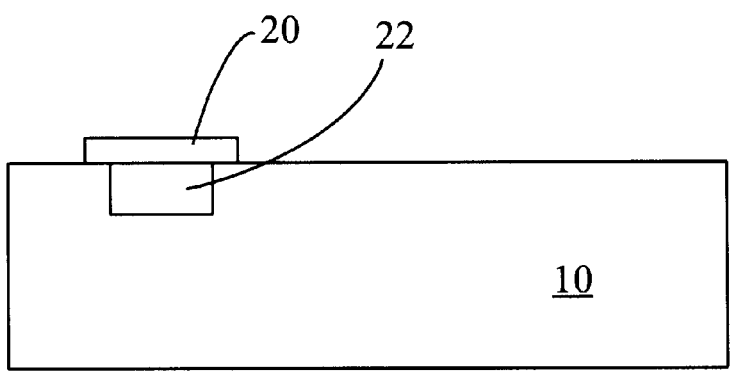
FIG. 7(b) illustrates the suspension assembly after the sacrificial layer has been removed in accordance with an embodiment of the present invention.
Figure 8A:
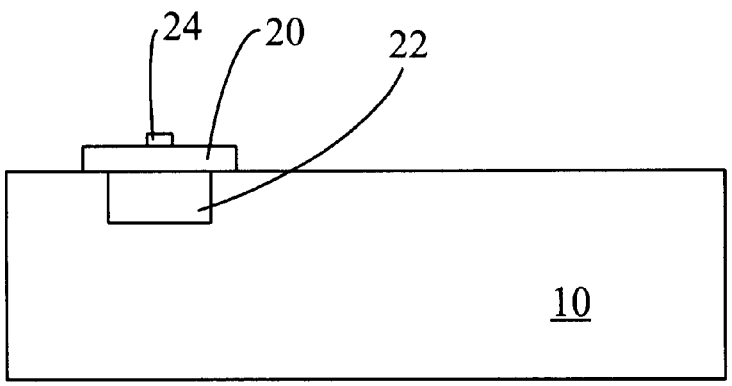
FIG. 8(a) illustrates the suspension assembly including a slider positioned thereon in accordance with an embodiment of the present invention.
Figure 8B:
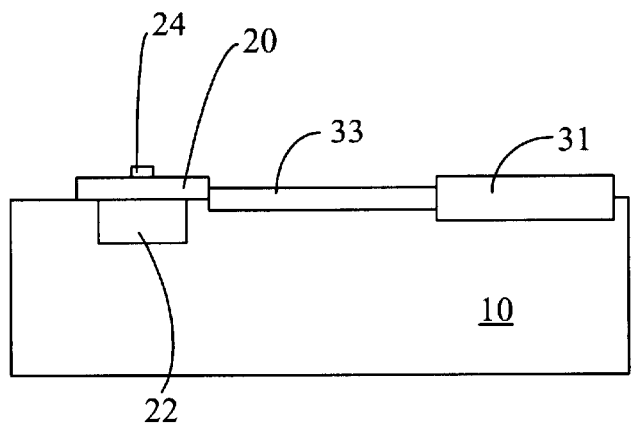
FIG. 8(b) illustrates circuitry and wiring formed in and/or on the suspension assembly in accordance with an embodiment of the present invention.

In the event a high temperature process is used to cure the material that will eventually become the membrane structure, the sacrificial material preferably has a melting point below the bake temperature After the high temperature baking process, a glassy carbon 20 (formed from the resin 16) is positioned over or adjacent to the sacrificial copper layer 12 on the silicon arm 10 as illustrated in FIG. 7(a). The term adjacent as used above refers to at least a portion of the membrane 20 being positioned either over or under or next to the sacrificial copper layer, depending on the orientation of the device. The sacrificial copper layer 12 that is located beneath the membrane 20 may be removed, leaving a cavity 22 under the membrane 20 as illustrated in FIG. 7(b). This may be carried out, for example, by dipping the wafer into a copper etchant. The carbon-glass membrane is chemically resistant to the etching solution and will not be significantly removed while the sacrificial copper is etched. A slider 24 may be positioned on the membrane 20 as illustrated in FIG. 8(a). FIG. 8(b) illustrates the suspension arm 10 including in-line circuitry such as circuit 31 and wiring 33 extending on and/or in the surface of the suspension arm 10 to connect to the membrane 20 for communication to and from the slider 24.

Other materials to form the membrane that may be utilized are spin-on glasses and/or Polysilsesquioxones (e.g. poly(methylsilsesquioxone) or MSSQ) which, upon annealing, curing, or exposure to a oxygen containing plasma, transforms into a crosslinked glass-containing matrix material that may include silica. These materials can be applied to across a wafer and crosslinked in the spaces created within a patterned photo-resist layer. Common catalysts to cure such materials may include dibutylindiacetate, zinc acetate, or zinc 2-ethylhexanoate.

An alternate process to pattern a polysilsesquioxone (e.g., MSSQ) layer is to apply a layer to a wafer with a pre-patterned sacrificial structure such as shown in FIG. 1. The MSSQ layer is then cured, crosslinked or oxidized. A photoresist layer is patterned on top of the MSSQ and the pattern is transferred through the MSSQ using a fluorine-containing plasma. The photoresist layer is removed, leaving a structure on the wafer having a cross-section that is similar to that shown in FIG. 6. The cured resin 16 using this process will be a cured silica-containing matrix or polymer.

Figure 9:
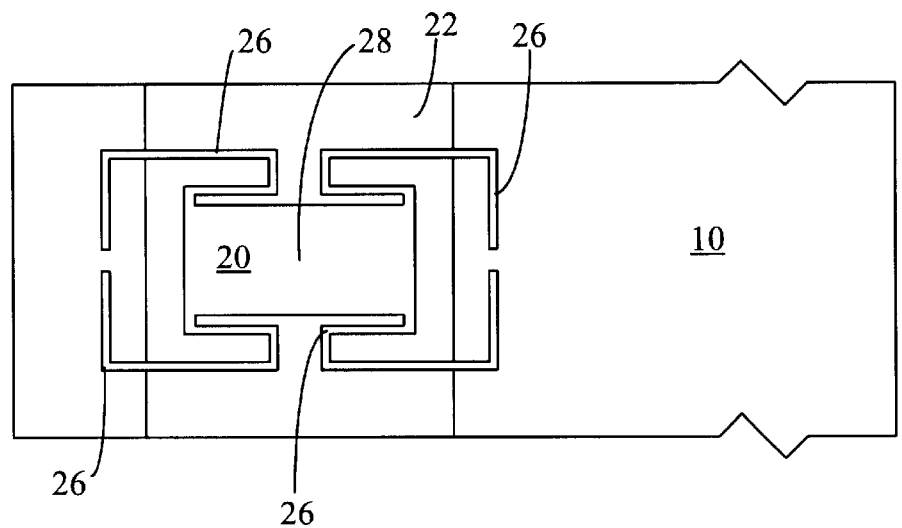
FIG. 9 illustrates a top view of a suspension assembly including a membrane structure on which a slider can be positioned in accordance with an embodiment of the present invention.
Figure 10A:
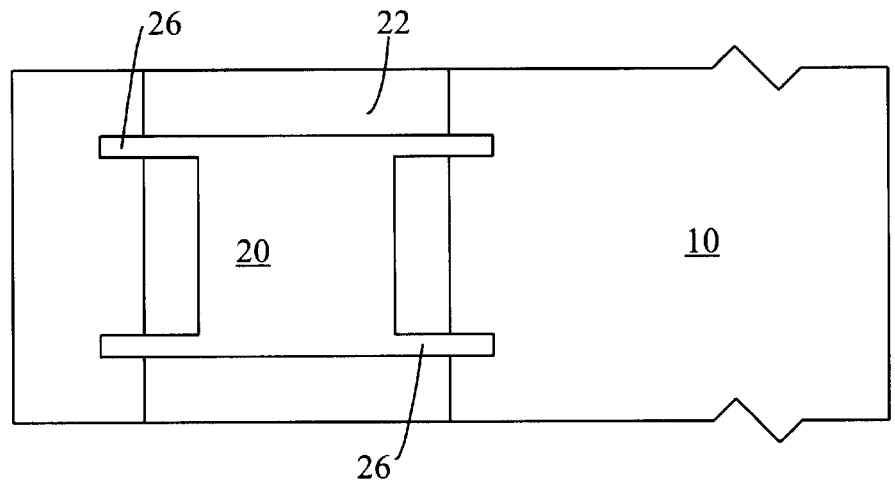
FIG. 10(a) illustrates a top view of a suspension assembly including a membrane structure on which a slider can be positioned in accordance with an embodiment of the present invention.
Figure 10B:
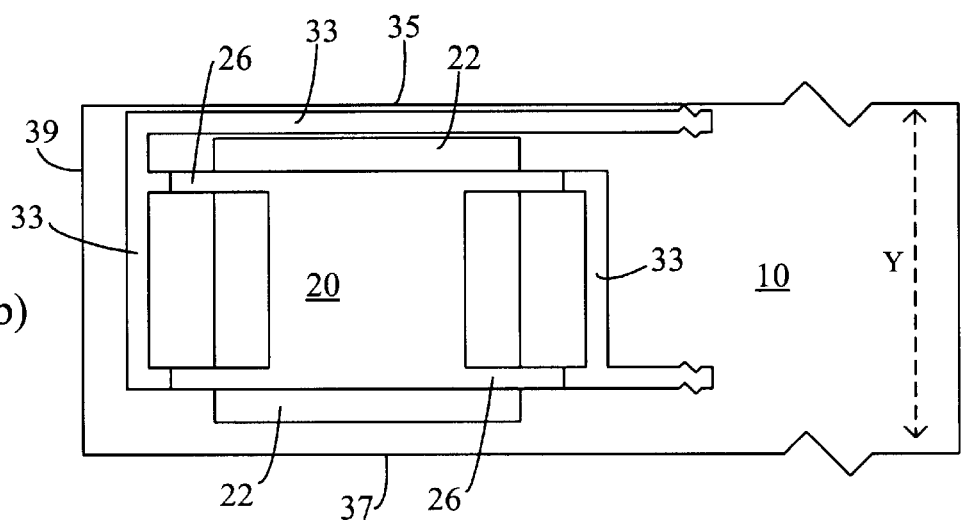
FIGS. 10(b) and 10(c) illustrate top views of a suspension assembly including a membrane structure on which a slider can be positioned and wiring lines in accordance with embodiments of the present invention.
Figure 10C:
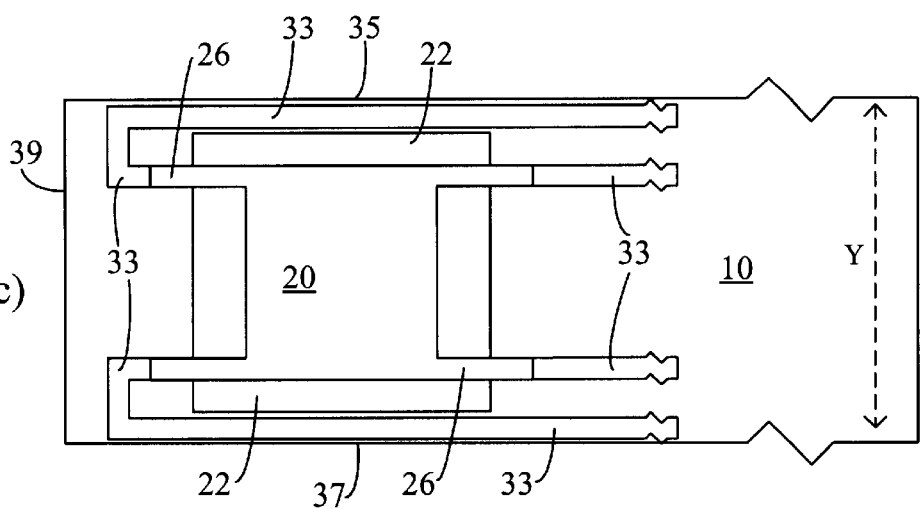

A variety of membrane 20 designs may be utilized, including, but not limited to those having arms which may act as springs. FIG. 9 illustrates top view of a suspension arm 10 having a cavity 22 therein and a membrane 20 extending adjacent (and across) the cavity, wherein the membrane 20 includes arms 26 that make several turns and then connect to a central portion 28 on which a slider may be positioned. FIG. 10(a) illustrates another top view of a design in which the arms 26 extend straight across the cavity 22. Many other designs are also possible. The designs should be selected to provide for an appropriate amount flexibility and stiffness in the desired direction. In certain embodiments, the cavity 22 over which the membrane 20 extends does not extend all the way across the suspension arm 10. In such embodiments, as shown in FIGS. 10(b) and 10(c), the cavity 22 extends across the suspension arm 10 and ends at a location spaced from the sides 35, 37 of the suspension arm 10. If desired, wiring lines 33 may extend on one or both sides of the membrane 20 adjacent to the sides 35 and 37 and even extend to a position near to the end 39 of the suspension arm and connect to one or more of the arms 26 of the membrane 20. FIG. 10(b) illustrates wiring 33 connecting to the arms 26 of the membrane 20. One wiring portion 33 extends close to suspension arm 10 side surface 35 prior to connecting to two arm portions 26 of the membrane. FIG. 10(c) illustrates wiring lines 33 extending very close to sides 35 and 37 and also shows a single wiring line 33 connected to each membrane arm 26.

Figure 11A:
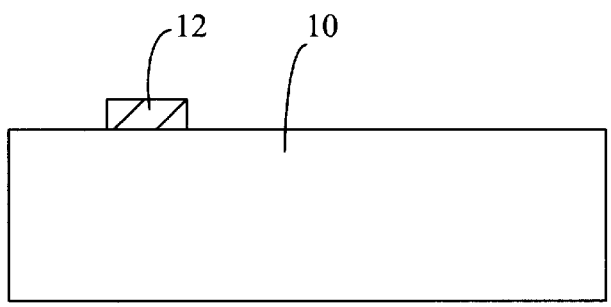
FIGS. 11–12 illustrate the formation of a sacrificial layer and membrane structure in accordance with embodiments of the present invention.
Figure 11B:
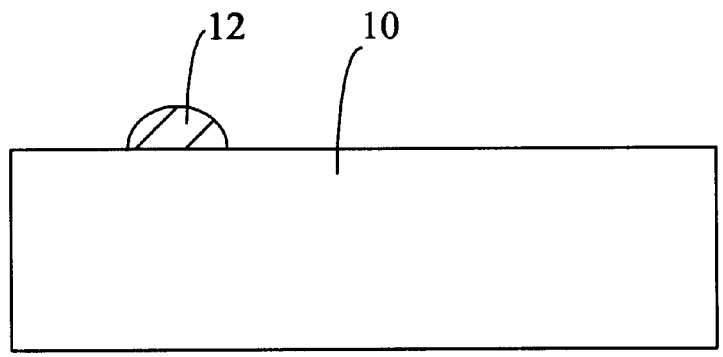
Figure 12A:
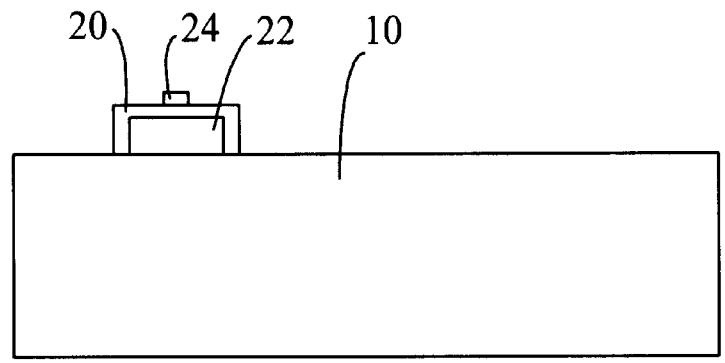
Figure 12B:
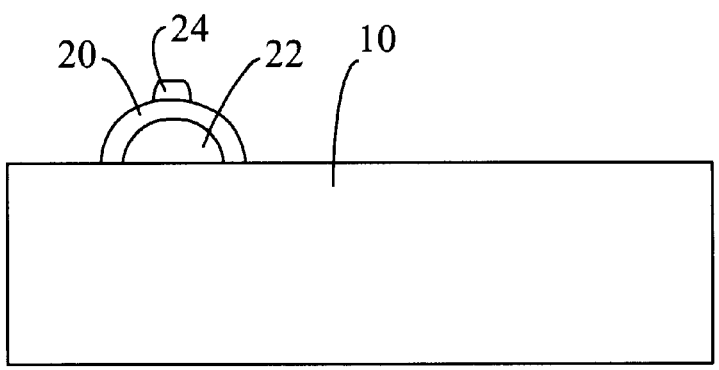

While certain embodiments include a suspension assembly having a silicon arm and a glassy carbon membrane thereon, it is also possible to use a variety of other materials for both the arm and the membrane. In addition, in embodiments utilizing a sacrificial layer, a variety of materials may be used as the sacrificial material. The size and shape of the sacrificial layer may also be varied. In another embodiment illustrated in FIG. 11, a sacrificial layer 12 is formed on the surface of the suspension arm 10 instead of in a trench in the suspension arm as described earlier (FIG. 2(b)). The sacrificial layer 12 may be formed in a variety of shapes, for example, a box-like shape as illustrated in FIG. 11 (a) and a rounded shape as illustrated in FIG. 11(b). A membrane 20 may be formed to extend over at least a portion of the sacrificial layer 12 in a manner such as that described earlier. The sacrificial layer 12 may be removed to leave cavity 22, and a read/write head 24 may be attached to the membrane 20, as illustrated in FIGS. 12(a) and 12(b).

Figure 13:
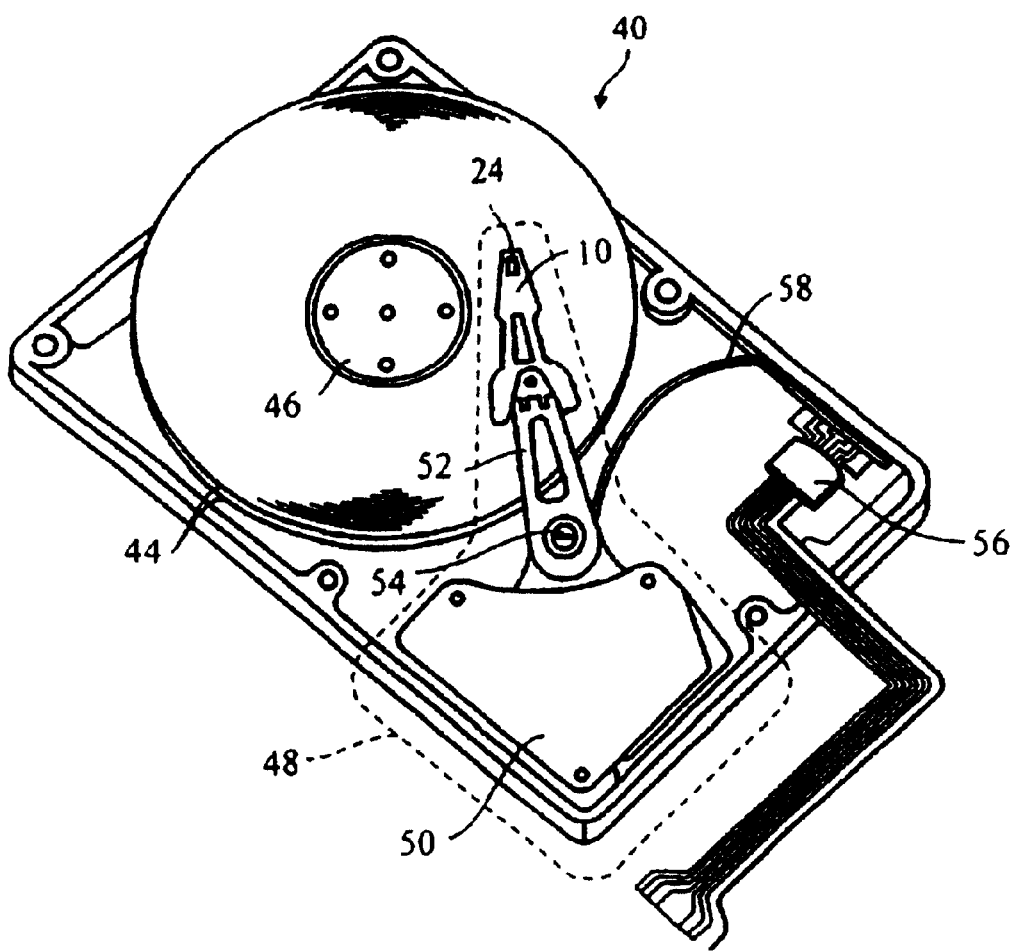
FIG. 13 illustrates a disk drive system in accordance with an embodiment of the present invention.

FIG. 13 illustrates portions of a disk drive system 40 according to an embodiment of the present invention. The system includes one or more magnetic disks 44 stacked above one another. The disks 44 may be conventional particulate or thin film recording disks, which are capable of storing digital data in concentric tracks. Both sides of the disks 44 may be available for storage. The disks 44 are mounted to a spindle 46. The spindle 46 is attached to a spindle motor, which rotates the spindle 46 and the disks 44 to provide read/write access to the various portions of the concentric tracks on the disks.

The disk drive system 40 also includes an actuator assembly 48 including voice coil motor assembly 50, which controls a head arm assembly which may include a positioner arm 52 and a suspension arm 10. The positioner arm 52 further includes a pivot 54 around which the positioner arm 52 moves. The suspension arm 10 may have a variety of geometries, and, as described above, may be formed from silicon and have in-line circuitry, if desired. The suspension arm 10 may support a slider and read/write head 24. Although only one slider and read/write head 24 is shown, it will be recognized that the disk drive assembly 10 may include a read/write head for each side of each disk 44 included in the drive.

The disk drive system 40 may further include read/write chip 56. As is well known in the art, the read/write chip 56 cooperates with the read/write head 24 to read data from and write data to the disks 44. A flexible printed circuit member may 58 carry digital signals between the chip 56 and the actuator assembly 48.

It will, of course, be understood that modifications of the present invention, in its various aspects, will be apparent to those skilled in the art. Other embodiments are possible, their specific features depending upon the particular application. The scope of the invention should not be limited by the particular embodiments described herein.

What is claimed:

1. A method for forming a head suspension assembly, comprising:

forming a sacrificial layer extending into a portion of a substrate;

forming a transfer film including a mold of a suspension membrane therein;

filling the mold of the suspension membrane with a layer of material;

positioning the transfer film including the mold of the suspension membrane with the layer of material on the substrate;

baking the layer of material to density at least a portion of the layer of material; and removing the sacrificial layer to form a cavity extending a distance into the substrate;

wherein the baked layer of material is at least partially positioned adjacent to the cavity.

2. The method as in claim 1, wherein the substrate comprises silicon and the sacrificial layer is formed by etching a trench in the substrate and filling the trench with a metal.

3. The method as in claim 2, wherein removing the sacrificial layer comprises etching the metal from the trench.

4. The method as in claim 1, filter comprising forming the transfer film from a polymer material.

5. The method as in claim 1, further comprising forming the resin from the layer of material including carbon therein.

6. The method as in claim 1, wherein the substrate comprises silicon and the baked material comprises carbon.

7. The method as in claim 1, wherein the substrate comprises silicon, the transfer film comprises polydimethyl siloxane, and the baked material comprises a glassy carbon material.

8. The method as in claim 1, wherein the substrate comprises silicon, the transfer film comprises polysilsesquioxone, and the baked material includes a matrix containing silica.

9. The method as in claim 1, wherein the cavity extends a width that is no greater than that of the substrate and the cavity extends a depth that is less than the depth of the substrate.

10. The method as in claim 6, further comprising forming an adhesion layer between the silicon and the carbon.

11. The method as in claim 1, further comprising positioning a slider on the baked layer of material, wherein a portion of the layer of material is positioned between the slider and the cavity.

12. A method for forming a head suspension assembly, comprising forming a spacer layer extending a distance into a silicon substrate;

providing a transfer film including an opening defining the shape of a slider support membrane;

filling the opening defining the shape of the slider support membrane with a resin material;

positioning the transfer film with the resin material therein on the silicon substrate so that at least a portion of the resin material is positioned on the spacer layer;

baking the resin material to form a glassy carbon material; and removing the spacer layer to form a cavity in the silicon substrate adjacent to the glassy carbon material.

13. The method as in claim 12, further comprising curing the resin material prior to baking the resin material and after positioning the transfer film with the resin material thereon over the silicon wafer.

14. The method as in claim 13, further comprising removing the transfer film from the resin material after curing the resin material.

15. The method as in claim 12, wherein forming the spacer layer comprises forming a trench in the silicon substrate and filling the trench with a sacrificial material.

16. The method as in claim 15, wherein the sacrificial material has a predetermined thickness.

17. The method as in claim 15, wherein the sacrificial material comprises a metal.

18. The method as in claim 16, wherein the metal comprises copper.

19. The method as in claim 12, further comprising positioning a slider on the glassy carbon material.

20. The method as in claim 12, further comprising forming an adhesion layer on the silicon substrate prior to positioning the transfer film thereon.

* * * * *

UNITED STATES PATENT AND TRADEMARK OFFICE
CERTIFICATE OF CORRECTION

PATENT NO. : 6,725,526 B2 Page 1 of 1
APPLICATION NO. : 10/047229
DATED : April 27, 2004
INVENTOR(S) : Jeffrey S. Lille It is certified that error appears in the above-identified patent and that said Letters Patent is hereby corrected as shown below:

Column 8, line 32, delete "filter" and add -- further -- .

Signed and Sealed this

Ninth Day of January, 2007

JON W. DUDAS
*Director of the United States Patent and Trademark Office*